United States Patent [19]

Ziff

[11] Patent Number: 5,813,606
[45] Date of Patent: Sep. 29, 1998

[54] RADIO CONTROLLED SPRINKLER CONTROL SYSTEM

[76] Inventor: Raymond Ziff, 28052 Tefir St., Mission Viejo, Calif. 92692

[21] Appl. No.: 826,569

[22] Filed: Apr. 4, 1997

[51] Int. Cl.$^6$ .......................... A01G 25/00; A01G 27/00
[52] U.S. Cl. .............................. 239/67; 239/63; 239/69; 239/DIG. 15
[58] Field of Search .................................. 239/63, 67, 69, 239/99, 276, 562, DIG. 15

[56] References Cited

U.S. PATENT DOCUMENTS

| | | | |
|---|---|---|---|
| 3,114,243 | 12/1963 | Winters | 239/63 X |
| 3,750,950 | 8/1973 | Whitener | 239/67 X |
| 4,396,149 | 8/1983 | Hirsch | 239/63 |
| 4,838,310 | 6/1989 | Scott et al. | 239/69 X |
| 5,333,785 | 8/1994 | Dodds et al. | 239/67 X |

*Primary Examiner*—Andres Kashnikow
*Assistant Examiner*—Robin O. Evans

[57] ABSTRACT

A radio controlled sprinkler control system including at least one transmitter unit with a housing. Each housing has at least one moisture sensor with a cylindrical configuration having a top end coupled to a bottom face of the housing and a bottom end with a conical shape for allowing the moisture sensor to be inserted within the ground. The moisture sensor is adapted to generate a moisture signal representative of the moisture level of the ground in which it is inserted. Each transmitter unit further includes a radio transmitter connected to the moisture sensors for transmitting an activation signal upon the receipt of a moisture signal which is representative of a moisture level below a predetermined amount. Further provided are a plurality of sprinklers adapted to be actuated only upon the receipt of the activation signal by an associated radio receiver.

2 Claims, 3 Drawing Sheets

RADIO CONTROLLED SPRINKLER CONTROL SYSTEM

BACKGROUND OF THE INVENTION

1. Field of the Invention

The present invention relates to a radio controlled sprinkler control system and more particularly pertains to actuating a plurality of water apparatuses as a function of a moisture level of surrounding soil with a suitably structured moisture sensing transmitter unit and a valve which communicate via radio signals.

2. Description of the Prior Art

The use of moisture sensors is known in the prior art. More specifically, moisture sensors heretofore devised and utilized for the purpose of measuring a moisture level of soil are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,424,649 to Gluck et al.; U.S. Pat. No. 5,351,437 to Lishman; U.S. Pat. No. 4,937,732 to Brandisini; U.S. Pat. No. 5,083,886 to Whitman; U.S. Pat. No. 4,524,913 to Bron; and U.S. Pat. No. 4,971,248 to Marino.

In this respect, the radio controlled sprinkler control system according to the present invention substantially departs from the conventional concepts and designs of the prior art, and in so doing provides an apparatus primarily developed for the purpose of actuating a plurality of water apparatuses as a function of a moisture level of surrounding soil with a suitably structured moisture sensing transmitter unit and a valve which communicate via radio signals.

Therefore, it can be appreciated that there exists a continuing need for a new and improved radio controlled sprinkler control system which can be used for actuating a plurality of water apparatuses as a function of a moisture level of surrounding soil with a suitably structured moisture sensing transmitter unit and a valve which communicate via radio signals. In this regard, the present invention substantially fulfills this need.

SUMMARY OF THE INVENTION

In view of the foregoing disadvantages inherent in the known types of moisture sensors now present in the prior art, the present invention provides an improved radio controlled sprinkler control system. As such, the general purpose of the present invention, which will be described subsequently in greater detail, is to provide a new and improved radio controlled sprinkler control system which has all the advantages of the prior art and none of the disadvantages.

To attain this, the present invention essentially comprises a plurality of transmitter units each including a housing with a rear face, a top face, a bottom face, and a pair of side faces defining a front opening and interior space. As best shown in FIGS. 2 & 4, each housing has a square transparent plate coupled via screws over the front opening. For preventing moisture from entering the interior space of the housing, a rectangular gasket is situated between the housing and the transparent plate. Each transmitter unit also includes a pair of moisture sensors each with a cylindrical configuration. A top end of each moisture sensor is coupled to the bottom face of the housing of the associated transmitter unit and a bottom end is equipped with a conical shape for allowing the moisture sensors to be inserted within the ground. In use, each moisture sensor is adapted to generate a moisture signal representative of the moisture level of the ground in which it is inserted. Further included as a component of each transmitter unit is a radio transmitter situated in the interior space thereof. The radio transmitter is connected to the moisture sensors for transmitting an activation signal upon the receipt of a moisture signal which is representative of a moisture level below a predetermined level of moisture. Situated on the top face of the housing of each transmitter unit is an antenna for facilitating the transmission of the activation signal. With reference to FIGS. 3 & 4, a control knob is situated within the interior space of the housing adjacent the transparent panel for allowing a user to select the predetermined level of moisture. The setting of the knob may be viewed from outside the housing. As shown in FIG. 1, a plurality of sets of sprinklers are each dispersed throughout a lawn and situated adjacent an associated transmitter unit. Each set of sprinklers are connected to a water source via a common distribution pipe situated underground. Associated therewith is a plurality of valves each connected to an associated distribution pipe. Each valve is adapted to allow the supply of water through the associated distribution pipe to the corresponding sprinklers upon the receipt of a valve actuation signal. Upon the lack of receipt of the valve actuation signal, each valve is adapted to preclude the supply of water through the associated distribution pipe to the corresponding sprinklers. Finally, a receiver unit is included with a rectangular housing having an interior space. A radio receiver is positioned within the housing and connected to each of the valves. By this structure, the radio receiver is adapted to transmit a valve actuation signal to a valve only upon the receipt of the activation signal from the corresponding transmitter unit. For facilitating the receipt of the activation signals, an antenna is situated on the rectangular housing.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved radio controlled sprinkler control system which has all the advantages of the prior art moisture sensors and none of the disadvantages.

It is another object of the present invention to provide a new and improved radio controlled sprinkler control system which may be easily and efficiently manufactured and marketed.

It is a further object of the present invention to provide a new and improved radio controlled sprinkler control system which is of a durable and reliable construction.

An even further object of the present invention is to provide a new and improved radio controlled sprinkler control system which is susceptible of a low cost of manufacture with regard to both materials and labor, and which accordingly is then susceptible of low prices of sale to the consuming public, thereby making such radio controlled sprinkler control system economically available to the buying public.

Still yet another object of the present invention is to provide a new and improved radio controlled sprinkler control system which provides in the apparatuses and methods of the prior art some of the advantages thereof, while simultaneously overcoming some of the disadvantages normally associated therewith.

Still another object of the present invention is to actuate a plurality of water apparatuses as a function of a moisture level of surrounding soil with a suitably structured moisture sensing transmitter unit and a valve which communicate via radio signals.

Lastly, it is an object of the present invention to provide a new and improved radio controlled sprinkler control system including at least one transmitter unit with a housing. Each housing has at least one moisture sensor with a cylindrical configuration having a top end coupled to a bottom face of the housing and a bottom end with a conical shape for allowing the moisture sensor to be inserted within the ground. The moisture sensor is adapted to generate a moisture signal representative of the moisture level of the ground in which it is inserted. Each transmitter unit further includes a radio transmitter connected to the moisture sensors for transmitting an activation signal upon the receipt of a moisture signal which is representative of a moisture level below a predetermined amount. Further provided are a plurality of sprinklers adapted to be actuated only upon the receipt of the activation signal by an associated radio receiver.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
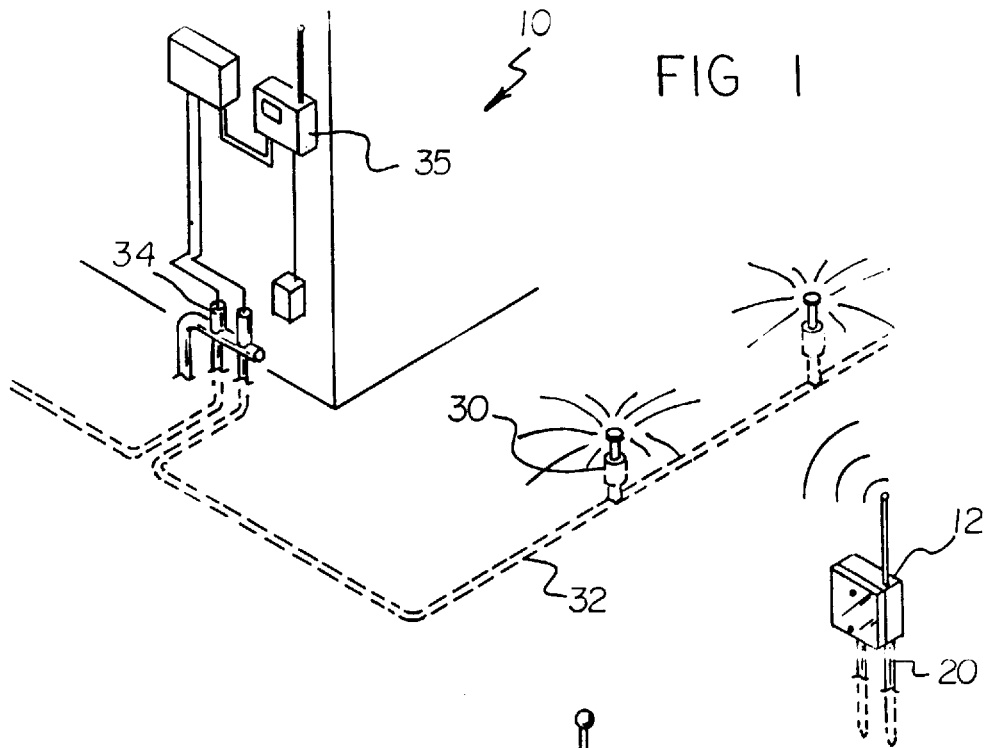
FIG. 1 is a perspective illustration of the preferred embodiment of the radio controlled sprinkler control system constructed in accordance with the principles of the present invention.

With reference now to the drawings, and in particular to FIG. 1 thereof, a new and improved radio controlled sprinkler control system embodying the principles and concepts of the present invention and generally designated by the reference numeral 10 will be described.

The present invention, the new and improved radio controlled sprinkler control system, is comprised of a plurality of components. Such components in their broadest context include a plurality of transmitter units, a plurality of sets of sprinklers, a plurality of valves, and a receiver unit. Such components are individually configured and correlated with respect to each other so as to attain the desired objective.

Figure 2:
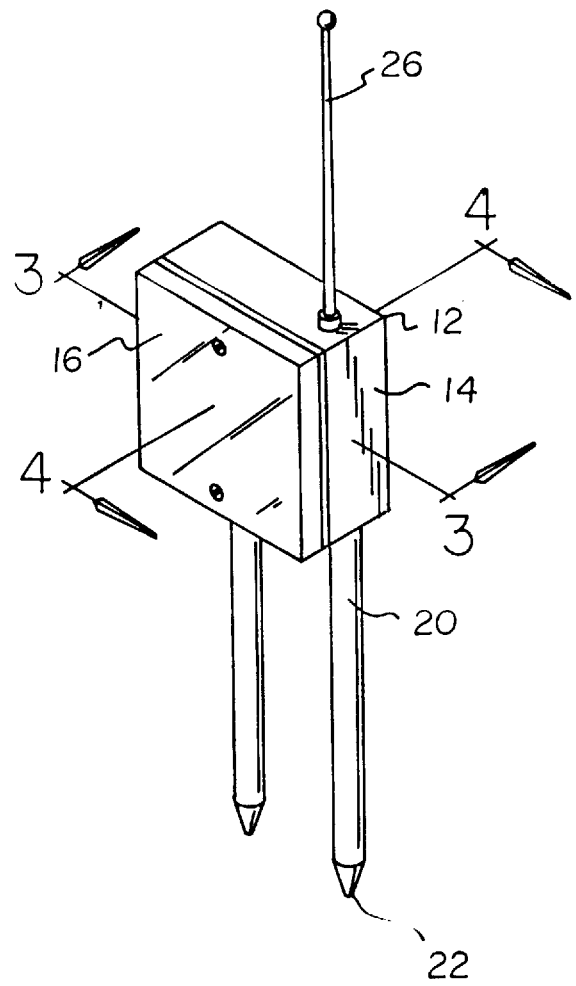
FIG. 2 is a close up perspective view of one of the transmitter units shown in FIG. 1.
Figure 4:
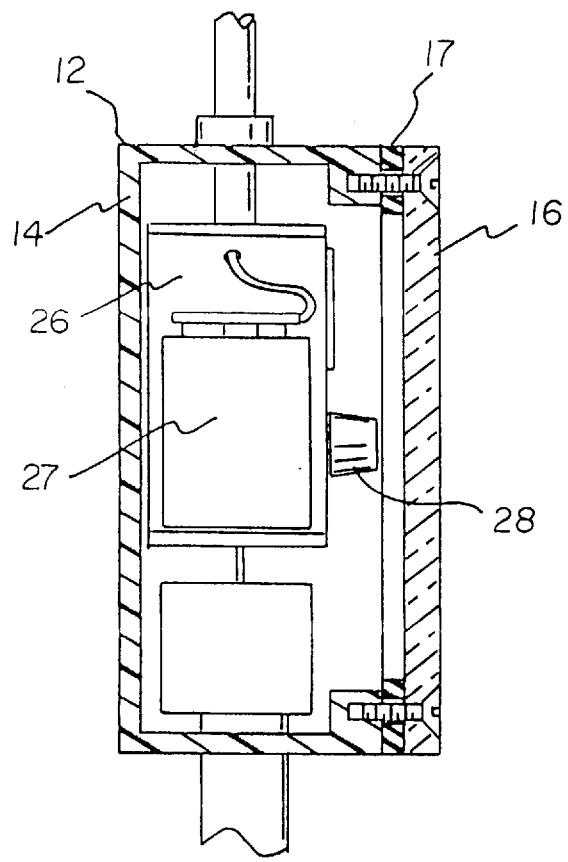
FIG. 4 is another cross-sectional view of a transmitter unit taken along line 4—4 shown in FIG. 2.
Figure 5:
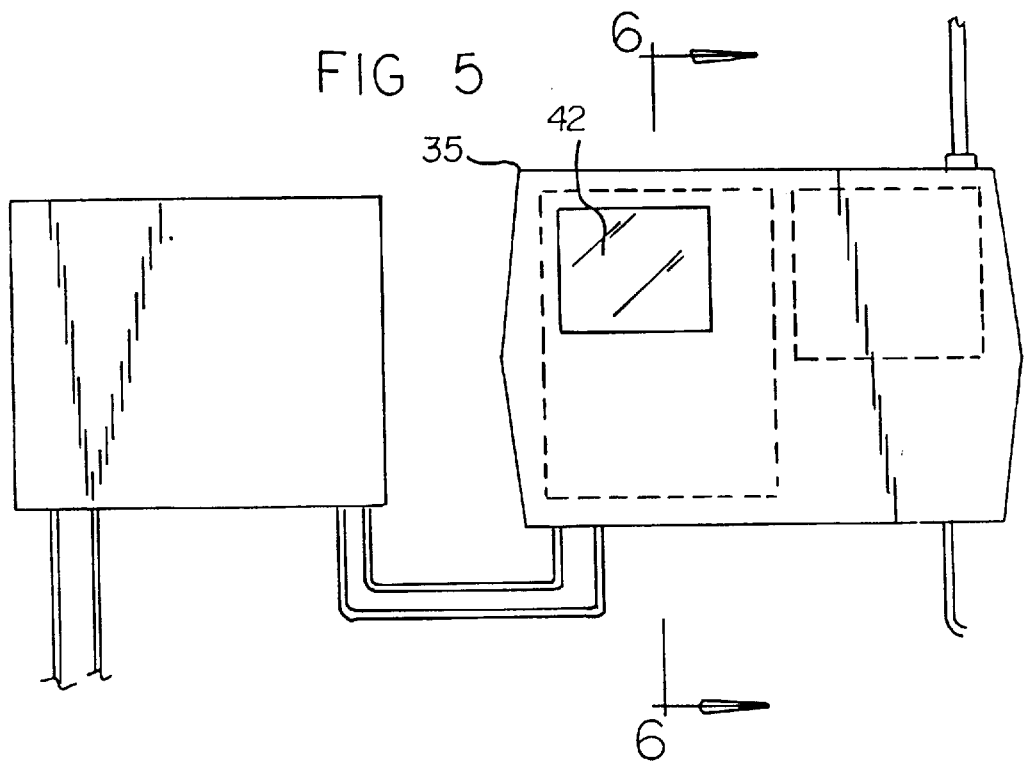
FIG. 5 is a front view of the receiver unit of the present invention shown in FIG. 1.
Figure 6:
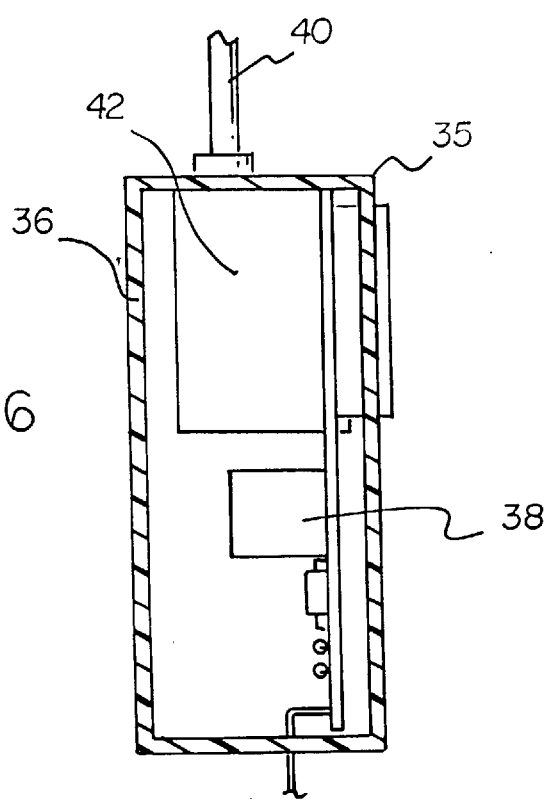
FIG. 6 is a cross-sectional view of the receiver unit taken along line 6—6 shown in FIG. 5.

More specifically, it will be noted that the system 10 of the present invention includes a plurality of transmitter units 12 each including a housing 14 with a rear face, a top face, a bottom face, and a pair of side faces defining a front opening and interior space. As best shown in FIGS. 2 & 4, each housing has a square transparent plate 16 coupled over the front opening. For preventing moisture from entering the interior space of the housing, a rectangular gasket 17 is situated between the housing and the transparent plate. Preferably, the housing, gasket, and the transparent plate are each equipped with a pair of threaded bores for allowing the coupling thereof via screws. For reasons that will become apparent later, it is imperative that no more than two screws be utilized in order to facilitate quick convenient access to the interior space.

Each transmitter unit also includes a pair of moisture sensors 20 each with a cylindrical configuration. A top end of each moisture sensor is coupled to the bottom face of the housing of the associated transmitter unit. A bottom end 22 of each moisture sensor is equipped with a conical shape for allowing the moisture sensor to be inserted within the ground in a vertical orientation. As shown in FIG. 2, the moisture sensors are preferably spaced. In use, each moisture sensor is adapted to generate a moisture signal representative of the moisture level of the ground in which it is inserted. Ideally, the moisture signals of each of the sensors are averaged to afford a single signal representative of a more accurate moisture level. It should be noted that the specific construction of moisture sensors is commonly known as is exemplified by U.S. Pat. No. 5,424,649.

Figure 3:
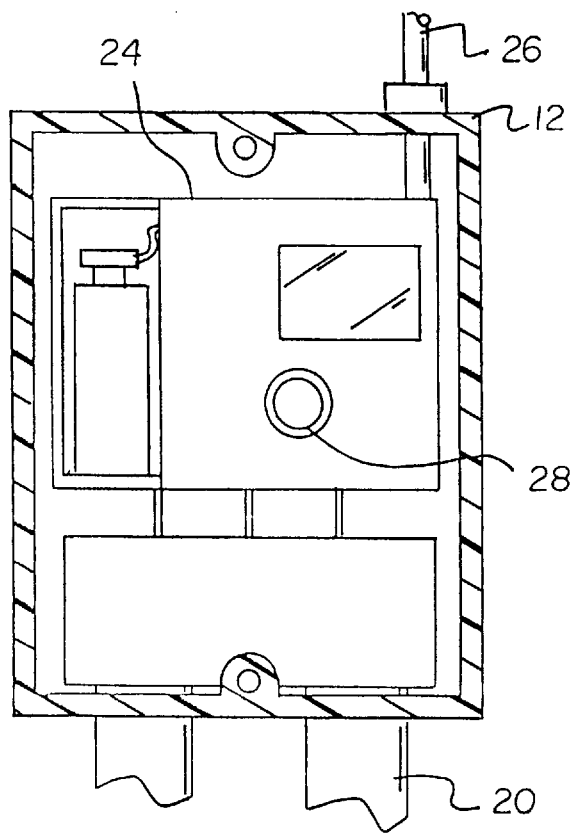
FIG. 3 is a cross-sectional view of a transmitter unit taken along line 3—3 shown in FIG. 2.

Further included as a component of each transmitter unit is a radio transmitter 24 situated in the interior space thereof. The radio transmitter is connected to the moisture sensors for transmitting an activation signal via free space upon the receipt of a moisture signal which is representative of a moisture level below a predetermined level of moisture. Situated on the top face of the housing of each transmitter unit is an antenna 26 for facilitating the transmission of the activation signal. The activation signal of each radio transmitter is ideally comprised of unique frequency or a specific identification code. As shown in FIGS. 3 & 4, the transmitter units are powered by a battery 27.

With reference to FIGS. 3 & 4, a control knob 28 is situated within the interior space of the housing adjacent the transparent panel for allowing a user to select the predetermined level of moisture. The setting of the knob may be viewed from outside the housing. Indicia may be included to facilitate such viewing.

As shown in FIG. 1, a plurality of sets of sprinklers 30 are each dispersed throughout a lawn and situated adjacent an associated transmitter unit. Each set of sprinklers are connected to a water source via a common distribution pipe 32 situated underground. In the alternative, above-the-ground distribution pipes may be utilized.

Associated therewith is a plurality of valves 34 each connected to an associated distribution pipe. Each valve is adapted to allow the supply of water through the associated distribution pipe to the corresponding sprinklers upon the receipt of a valve actuation signal. Upon the lack of receipt of the valve actuation signal, each valve is adapted to preclude the supply of water through the associated distribution pipe to the corresponding sprinklers.

Finally, a receiver unit 35 is included with a rectangular housing 36 having an interior space. A radio receiver 38 is positioned within the housing and connected to each of the valves. By this structure, the radio receiver is adapted to transmit a valve actuation signal to a valve only upon the receipt of the activation signal via free space from the corresponding transmitter unit. To discern which transmitter unit has deployed the activation signal, the radio receiver is adapted to utilize the specific frequency or identification code of the activation signal. For facilitating the receipt of the activation signals, an antenna 40 is situated on the rectangular housing. As an option, a display 42 may be connected to the radio receiver. Further, the transmitters of each of the transmitter units may be adapted to transmit via free space a current moisture level and predetermined moisture level upon a change therein. Such information would be depicted via the display for each set of sprinklers, thereby allowing a user to monitor the system from the receiver unit.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved radio controlled sprinkler control system comprising, in combination:

a plurality of transmitter units each including a housing having a rear face, a top face, a bottom face, and a pair of side faces defining a front opening and interior space, each housing having a square transparent plate coupled via screws over the front opening wherein a rectangular gasket is situated between the housing and the transparent plate for preventing moisture from entering the interior space of the housing, each transmitter unit also including a pair of moisture sensors each with a cylindrical configuration having a top end coupled to the bottom face thereof and a bottom end with a conical shape for allowing the moisture sensors to be inserted within the ground, each moisture sensor adapted to generate a moisture signal representative of the moisture level of the ground in which it is inserted, each transmitter unit further including a radio transmitter situated in the interior space thereof and connected to the moisture sensors for transmitting an activation signal upon the receipt of a moisture signal which is representative of a moisture level below a predetermined level of moisture, an antenna situated on the top face of the housing thereof and connected to the radio transmitter for facilitating the transmission of the activation signal, and a control knob situated within the interior space of the housing adjacent the transparent panel for allowing a user to select the predetermined level of moisture, whereby the setting of the knob may be viewed from outside the housing;

a plurality of sets of sprinklers each dispersed throughout a lawn and situated adjacent an associated transmitter unit, each set of sprinklers connected to a water source via a common distribution pipe situated underground;

a plurality of valves each connected to an associated distribution pipe, each valve adapted to allow the supply of water through the associated distribution pipe to the corresponding sprinklers upon the receipt of a valve actuation signal, each valve further adapted to preclude the supply of water through the associated distribution pipe to the corresponding sprinklers upon the lack of receipt of the valve actuation signal; and a receiver unit including a rectangular housing with an interior space, a radio receiver positioned within the housing and connected to each of the valves and adapted to transmit a valve actuation signal to a valve only upon the receipt of the activation signal from the corresponding transmitter unit, and an antenna situated on the rectangular housing for facilitating the receipt of the activation signals.

2. A radio controlled water apparatus control system comprising:

at least one transmitter unit including a housing, each housing having at least one moisture sensor having a top end coupled to the bottom face thereof and a bottom end for allowing the moisture sensor to be inserted within the ground, the moisture sensor adapted to generate a moisture signal representative of the moisture level of the ground in which it is inserted, each transmitter unit further including a radio transmitter situated in the interior space thereof and connected to the moisture sensor for transmitting an activation signal via free space upon the receipt of a moisture signal which is representative of a moisture level below a predetermined level of moisture;

at least one set of water apparatuses situated adjacent an associated transmitter unit, the set of water apparatuses connected to a water source via a common distribution pipe;

at least one valve connected to an associated distribution pipe, each valve adapted to allow the supply of water through the associated distribution pipe to the corresponding water apparatuses upon the receipt of a valve actuation signal, each valve further adapted to preclude the supply of water through the associated distribution pipe to the corresponding water apparatuses upon the lack of receipt of the valve actuation signal; and a receiver unit including a radio receiver connected to each of the valves and adapted to transmit a valve actuation signal to a valve only upon the receipt of the activation signal via free space from the corresponding transmitter unit;

wherein the housing of the transmitter unit includes a rear face, a top face, a bottom face, and a pair of side faces defining a front opening and interior space, the transmitter unit further including a transparent plate coupled over the front opening wherein a gasket is situated between the housing and the transparent plate for preventing moisture from entering the interior space of the housing and a control knob situated within the interior space of the housing adjacent the transparent panel for allowing a user to select the predetermined level of moisture, whereby the setting of the knob may be viewed from outside the housing.

* * * * *